(12) United States Patent
Brettes et al.

(10) Patent No.: US 8,757,046 B2
(45) Date of Patent: Jun. 24, 2014

(54) PISTON WITH A DUCT UNDER A GASKET

(75) Inventors: Frédéric Brettes, Boissise le Roi (FR); Alain François Jean Lavie, Yerres (FR)

(73) Assignee: SNECMA, Paris (FR)

( * ) Notice: Subject to any disclaimer, the term of this patent is extended or adjusted under 35 U.S.C. 154(b) by 727 days.

(21) Appl. No.: 13/071,850

(22) Filed: Mar. 25, 2011

(65) Prior Publication Data
US 2011/0232479 A1    Sep. 29, 2011

(30) Foreign Application Priority Data
Mar. 25, 2010   (FR) ..................................... 10 52160

(51) Int. Cl.
*F16J 1/09* (2006.01)
(52) U.S. Cl.
USPC .............................. 92/182; 92/181 P; 92/185
(58) Field of Classification Search
USPC ...... 92/162 R, 162 P, 174, 181 R, 181 P, 182, 92/184, 185; 277/457
See application file for complete search history.

(56) References Cited

U.S. PATENT DOCUMENTS

| | | | | |
|---|---|---|---|---|
| 1,508,264 A | * | 9/1924 | Armentrout | .................... 92/182 |
| 1,579,127 A | * | 3/1926 | Miller | ............................. 92/183 |
| 1,612,038 A | * | 12/1926 | Miller | ............................. 92/183 |
| 1,678,365 A | * | 7/1928 | Sutliff | ............................. 92/183 |
| 2,615,769 A | * | 10/1952 | Barnes et al. | ................. 277/457 |
| 3,224,378 A | * | 12/1965 | Graham | ........................ 417/511 |
| 3,631,766 A | * | 1/1972 | Kraakman | ................... 92/162 P |
| 4,932,313 A | * | 6/1990 | Gutknecht | .................. 92/181 R |

FOREIGN PATENT DOCUMENTS

| | | |
|---|---|---|
| FR | 2 018 352 | 5/1970 |
| FR | 2 911 932 A | 8/2008 |
| GB | 6759 | 0/1915 |

OTHER PUBLICATIONS

French Preliminary Search Report issued Oct. 13, 2010, in French 1052160, filed Mar. 25, 2010 (with English Translation of Category of Cited Documents).

* cited by examiner

*Primary Examiner* — Thomas E Lazo
(74) *Attorney, Agent, or Firm* — Oblon, Spivak, McClelland, Maier & Neustadt, L.L.P.

(57) ABSTRACT

The invention relates to a piston having a first face, a second face opposite to the first face, a third face connecting said first and second faces together and presenting a groove, and a sealing gasket housed in said groove. The piston includes a duct constituted by a first segment situated inside the piston and connecting said first face to said groove, by a second segment situated inside the piston and connecting said second face to said groove, and by an intermediate segment connecting together said first and second segments and crossing said groove, the walls of said intermediate segment being formed by the walls of said groove and by said sealing gasket in such a manner that said intermediate segment forms a leaktight tube that opens out solely via the first segment and via the second segment, said intermediate segment presenting at least one obstacle suitable for impeding the flow of fluid that flows along said intermediate segment.

12 Claims, 2 Drawing Sheets

PISTON WITH A DUCT UNDER A GASKET

FIELD OF THE INVENTION

The present invention relates to a piston having a first face, a second face opposite to the first face, a third face connecting said first and second faces together and presenting a groove, and a sealing gasket housed in said groove.

BACKGROUND OF THE INVENTION

A piston is an element that separates two chambers (a first chamber and a second chamber), each containing a fluid. For example, in an actuator, the actuator piston is suitable for moving in an actuator cylinder under drive from the fluid contained in the first chamber so as to exert an action on the fluid contained in the second actuator chamber, the fluid in turn exerting action on a piece of equipment that it is desired to actuate.

In order to be effective, the piston must form a leaktight interface between the two chambers, even when the piston is moving in its cylinder.

Nevertheless, in certain situations, it is desirable to maintain fluid flow between the first and second chambers. For example, in aviation turbines, fuel is used as fluid in actuators. The fuel therefore needs to be cooled. This cooling is provided by causing the fuel to flow continuously through the actuators and the pipework. It is therefore necessary to organize a leakage flow rate between the first chamber and the second chamber in order to allow the fuel to flow between those chambers.

By way of example, leakage flow is implemented by piercing a straight hole through the piston, which hole connects together the first and second chambers. Thus, a fluid flow is established between the chambers. Nevertheless, the hole must be of a diameter that is small enough to avoid harmfully decreasing the effectiveness of the piston in operation, while also allowing the fluid to be cooled sufficiently. In practice, this diameter needs to be less than 0.6 millimeters (mm). As a result, in operation, the hole rapidly becomes clogged by polluting particles (contained in the fluid), and this is undesirable.

Alternatively, this leakage flow may be implemented by placing a Lee-jet restrictor within the piston. The restrictor communicates via ducts both with the first chamber and with the second chamber and it presents strainers (filters) and pierced diaphragms through which the fluid passes on passing between the two chambers, thereby serving to reduce the fluid flow rate. Nevertheless, a Lee-jet restrictor is expensive, and it requires accurate positioning within the piston. In addition, it also tends to become clogged after prolonged use, since the strainers are of small size.

OBJECT AND SUMMARY OF THE INVENTION

The present invention seeks to propose a piston that makes it possible, at low cost, to establish a flow of fluid between the two chambers separated by the piston, while minimizing any tendency for the duct to clog, and while also facilitating maintenance of the duct.

This object is achieved by the fact that the piston includes a duct constituted by a first segment situated inside the piston and connecting said first face to said groove, by a second segment situated inside the piston and connecting said second face to said groove, and by an intermediate segment connecting together said first and second segments and crossing said groove, the walls of said intermediate segment being formed by the walls of said groove and by said sealing gasket in such a manner that said intermediate segment forms a leaktight tube that opens out solely via the first segment and via the second segment, said intermediate segment presenting at least one obstacle suitable for impeding the flow of fluid that flows along said intermediate segment.

By means of these provisions, any risks of clogging the duct passing through the piston are minimized, since there is no longer any need for the duct to present a cross-section smaller than some given size. It is the obstacle in the intermediate segment that impedes the flow of fluid therealong, and consequently that reduces the fluid flow rate through the duct. Such a duct is easily made, since, by way of example, the intermediate segment may be made by machining the groove, with the intermediate segment subsequently being closed over its entire side wall by the gasket that is placed in the groove. Similarly, access to the intermediate segment for cleaning it is made easy, since it suffices to remove the gasket from the groove in order to gain access to the intermediate segment.

Advantageously, the intermediate segment presents a plurality of bends that constitute the obstacles impeding the flow of fluid.

Advantageously, the intermediate segment presents at least one constriction that constitutes the obstacle(s) impeding the flow of fluid.

Advantageously, the intermediate segment presents portions in relief that constitute obstacles impeding the flow of fluid.

BRIEF DESCRIPTION OF THE DRAWINGS

The invention can be well understood and its advantages appear more clearly on reading the following detailed description of an embodiment given by way of non-limiting example. The description refers to the accompanying drawings, in which.

MORE DETAILED DESCRIPTION

Figure 1:
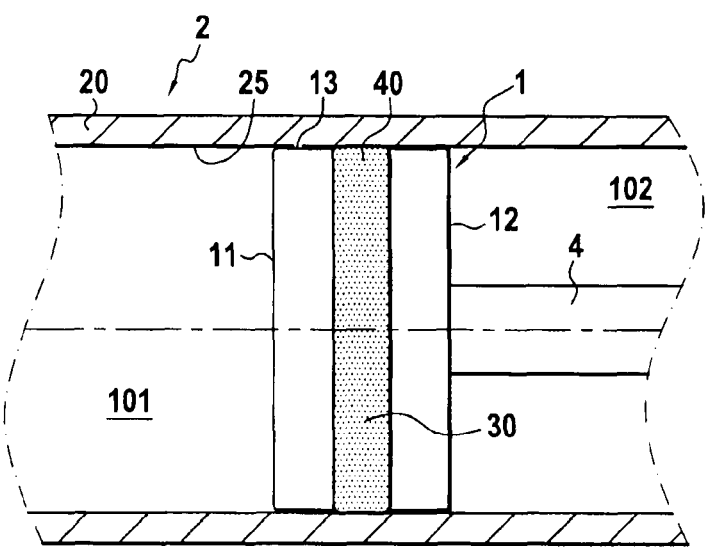
FIG. 1 is a diagrammatic view of a piston of the invention in an actuator.

FIG. 1 is a diagrammatic section view of a piston 1 of the invention situated in an actuator 2 for actuating a device. In the description below, the piston 1 is considered as being situated in an actuator 2, however the piston of the invention is not necessarily situated in an actuator.

The piston 1 separates a first chamber 101 in leaktight manner from a second chamber 102. The piston 1 is mounted on a rod 4 having a longitudinal axis A, and it therefore slides along the axis A. The piston 1 presents a first face 11 beside the first chamber 101, and a second face 12 opposite from the first face 11 and beside the second chamber 102. By way of example, the first face 11 and the second face 12 are substantially parallel and present an outline in the form of a circle.

The first face 11 and the second face 12 are united by a third face 13 constituting an annular face that extends along the longitudinal axis A and that constitutes the radially outer face of the piston 1. When the piston 1 moves in the cylinder 20 of the actuator 2, the third face 13 fits closely to the radially inside face 25 of the cylinder 20, for the purpose of establishing sealing at the interface between the piston 1 and the cylinder 20.

Figure 2:
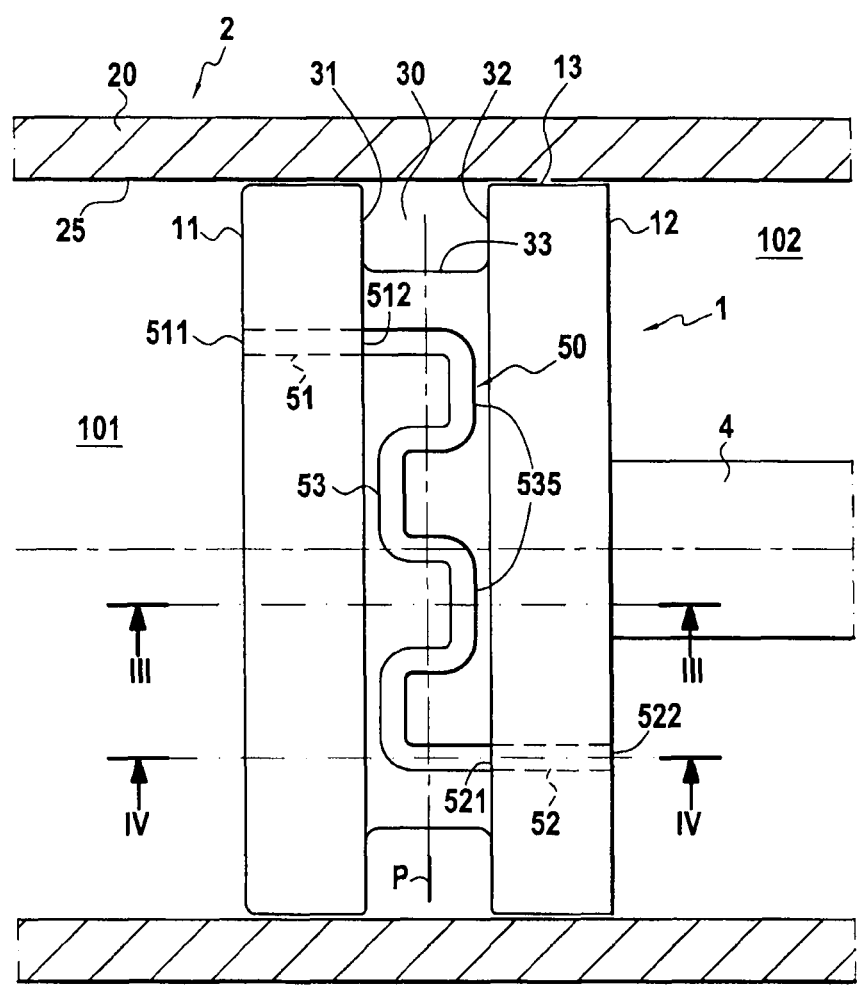
FIG. 2 is a longitudinal view of the piston of the invention showing the duct.

As can be seen in FIG. 2, which is an enlarged view of the region of the piston 1 that is close to the cylinder 20, the third face 13 presents a groove 30 going all around its circumference. The groove 30 is annular and it does not open out to the first face 11, nor does it open out to the second face 12. The groove 30 thus extends in a plane P perpendicular to the longitudinal axis A. The groove 30 is thus defined by a first side wall 31 closer to the first face 11, a second side wall 32 closer to the second face 12, on the other side to the first side wall 31, and a bottom wall 33 that interconnects the first and second side walls 31 and 32. The bottom wall 33 thus forms an annular wall that extends along the longitudinal axis A and that is intersected by the plane P.

In order to improve sealing at the interface between the piston 1 and its cylinder 20, the piston 1 includes a sealing gasket 40 that is received in the groove 30 and that rubs against the radially inside wall 25 of the cylinder 20 when the piston 1 moves (see FIG. 1). In FIG. 2, the sealing gasket 40 is omitted.

The sealing gasket is visible in FIGS. 3 and 4, as described below.

FIG. 2 shows the duct 50 that is included in the piston 1. The duct 50 comprises a first segment 51 that opens out at one of its ends into the first face 11 of the piston 1 via a first orifice 511. The first segment 51 opens out at its other end into the groove 30 via a second orifice 512.

The duct 50 also has a second segment 52 that opens out at one of its ends into the groove 30 via a first orifice 521. The second segment 52 opens out at its other end into the second face 12 of the piston 1 via a second orifice 522.

Over their entire lengths, the first and second cylinders 51 and 52 are surrounded by the material of the piston 1, such that the only access to each of these segments is via their orifices at their ends.

The first segment 51 and the second segment 52 are connected together by an intermediate segment 53.

The second orifice 512 where the first segment 51 opens out into the groove 30 is situated in part below the surface of the bottom wall 33 of the groove 30. Similarly, the first orifice 521 where the second segment 52 opens out into the groove 30 is situated in part below the surface of the bottom wall 33. Thus, the intermediate segment 53 forms an open channel that extends along and within the walls of the groove 30 of the piston 1 from the second orifice 512 of the first segment 51 to the first orifice 521 of the second segment 52, and it is open over its entire length into the groove 30.

The intermediate segment 53 is of a morphology such as to include one or more obstacles suitable for impeding the flow of fluid when fluid flows along the intermediate segment 53.

By way of example, the intermediate segment 53 presents a plurality of bends 535, that constitute obstacles.

This situation is shown in FIG. 2.

By way of example, the bends 535 are right-angled bends.

Each bend 535 disturbs the flow of fluid by fluid friction against the walls of the segment, and by creating turbulence. This decreases the flow coefficient of the duct 50, as defined by the ratio of the flow rate to the square root of the pressure difference across the ends of the duct.

The inventors have shown by experiment that the flow coefficient of such a bent duct, having a minimum diameter greater than 0.8 mm lies in the range 3 liters/hour per root bar (L/h/√bar) to 11 L/h/√bar.

The bends 535 may be of any shape. For example, the bends 535 may be U-shaped. When the first and second segments 51 and 52 are parallel, the number of bends 535 is even if each bend 535 is U-shaped, and the number of bends 535 is a multiple of four if each bend 535 is a right angle.

Alternatively, at the bends 535, or in combination therewith, the intermediate segment 53 presents at least one constriction 536 that contributes to impeding the flow of fluid.

Figure 5:
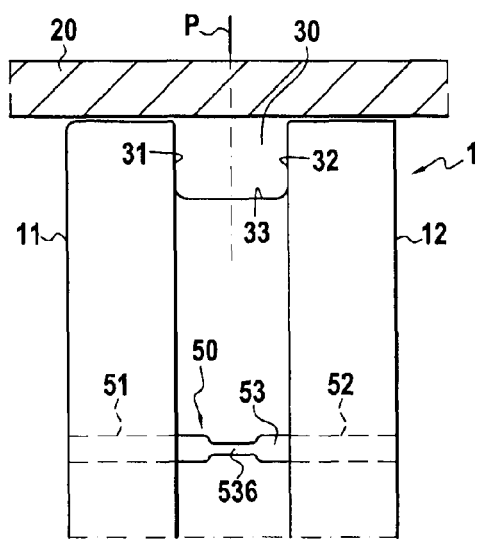
FIG. 5 is a longitudinal view of the piston in another embodiment of the invention showing the duct with constrictions.

Such a constriction 536 disturbs the flow of fluid and thus diminishes the flow coefficient of the duct 50. This situation is shown in FIG. 5 for an intermediate segment 53 that is straight and that presents one constriction 536.

Alternatively, in a situation that is not shown, it is possible to provide for the intermediate segment 53 to present a plurality of constrictions, in the form of a parallel connection of a plurality of mutually parallel narrow passages that join one another upstream and downstream.

Figure 6:
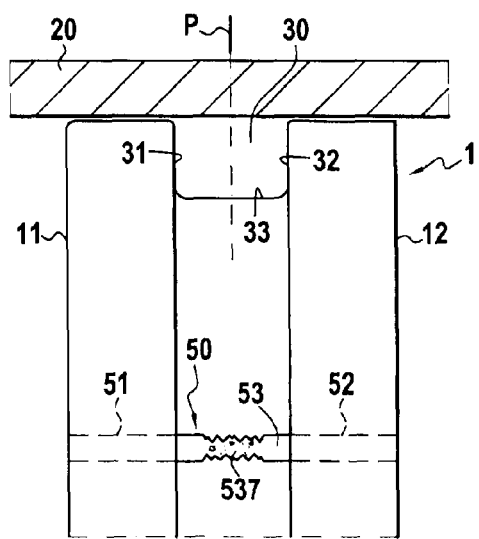
FIG. 6 is a longitudinal view of the piston in another embodiment of the invention showing the duct with portions in relief.

Alternatively, at the bends 535 and/or at the constrictions 536, or in combination therewith, the surface of the intermediate segment 53 may present portions in relief 537 that contribute to impeding the flow of fluid. This situation is shown in FIG. 6 for a straight intermediate segment 53 that presents portions in relief 537 on its surface over a fraction of its length.

These portions in relief 537 disturb the flow of fluid and thus decrease the flow coefficient of the duct 50.

Such portions in relief may constitute projections and/or depressions, extending to a greater or lesser extent relative to the length and the section of the intermediate segment 53, e.g. forming kinds of pillars of height that is less than or equal to the depth of the intermediate segment 53.

Figure 3:
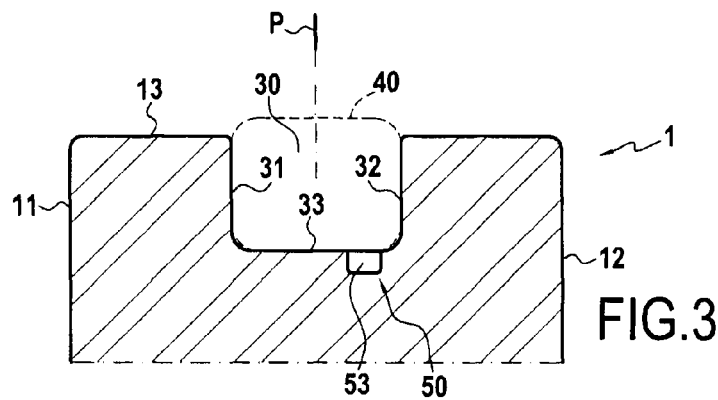
FIG. 3 is a section view on line III-III of FIG. 2, with the gasket placed in the groove.

FIG. 3 is a fragmentary section through the piston 1 perpendicularly to the plane P in which the groove 30 mainly extends, in a portion of the groove 30 in which the intermediate segment 53 is situated. The intermediate segment 53 is thus shown in cross-section (the plane of the section is radial relative to the longitudinal axis A).

The intermediate segment 53 forms a channel that extends in the bulk of the wall of the groove 30 of the piston 1. The intermediate segment 53 extends from the first side wall 31 to the second side wall 32 in the bottom wall 33. The intermediate segment 53 is thus surrounded on a fraction of its circumference by the material constituting the bottom wall 33 of the piston 1, and over the remainder of its circumference it is open into the groove 30, i.e. it is open-topped.

This shape for the intermediate segment 53 makes it easy to fabricate, e.g. by machining the bottom wall 33 of the groove 30.

Advantageously, the first segment 51 and the second segment 52 are rectilinear, such that each of them can be machined easily, respectively in the first side wall 31 and in the second side wall 32.

Figure 4:
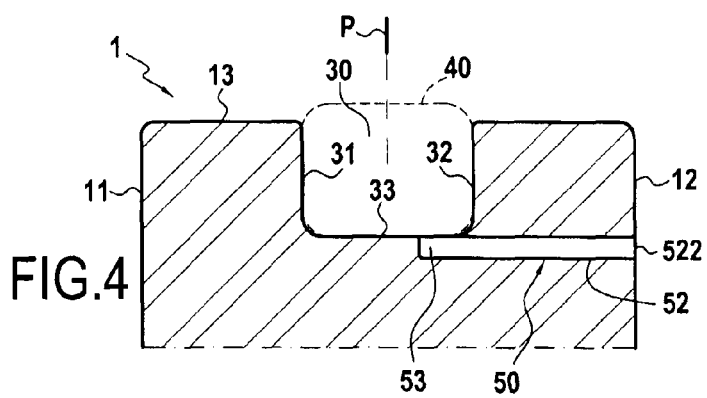
FIG. 4 is a section view on line IV-IV of FIG. 2 with the gasket placed in the groove.

FIG. 4 shows a fragmentary section of the piston 1 in a plane perpendicular to the plane P in which the groove 30 mainly extends, showing the portion of the groove 30 where the intermediate segment 53 joins the second segment 52. The intermediate segment 53 is thus shown in cross-section, while the segment 52 is shown in longitudinal section.

FIGS. 3 and 4 show a sealing gasket 40 that is housed in the groove 30. Once in position in the groove, the sealing gasket 40 fills the groove 30 and presses against the side walls 31 and 32 and the bottom wall 33 of the groove 30, completely covering the intermediate segment 53, such that the intermediate segment 53 forms a leaktight tube that opens out solely via the first segment 51 and the second segment 52. Thus, by positioning the sealing gasket 40 in the groove 30, the duct 50 is sealed along its entire length from the first orifice 511 opening out in the first face 11 to the second orifice 522 opening out in the second face 12.

The fluid can thus flow between the first chamber 101 and the second chamber 102 in sealed manner with a controlled leakage rate and without any risk of clogging the duct 50.

Furthermore, the duct 50 is easy to clean, since it suffices to remove the sealing gasket 40 in order to have access to the intermediate segment 53. The first and second segments 51 and 52 may be easily cleaned by inserting a cleaning sleeve.

In the above description, the intermediate segment 53 extends solely along the bottom wall 33.

Alternatively, the intermediate segment 53 may open out into the groove 30 via the first side wall 31 and/or the second side wall 32, and thus extend along the first side wall 31 and/or the second side wall 32 as well as along the bottom wall 33. Under such circumstances, the obstacles suitable for impeding fluid flow in the intermediate segment 53 (bends, constrictions, portions in relief) may be situated in the portion of the intermediate segment 53 that is situated along the first side wall 31 and/or along the second side wall 32. These obstacles then need not be present in the portion of the intermediate segment 53 that crosses the bottom wall 33, with this portion then forming a rectilinear channel extending between the first side wall 31 and the second side wall 32 of the groove 30. Alternatively, this portion of the intermediate segment 53 may also include obstacles.

Under all circumstances, once the gasket 40 has been put into position in the groove 30, it covers the intermediate segment 53 hermetically over its entire length.

In the above description, the obstacles such as the constrictions 536 or the portions in relief 537 are situated in the portion of the intermediate segment 53 that is formed out of the material constituting the walls of the groove 30. As an alternative, or in addition, these obstacles may be situated on the surface of the gasket 40, at locations where the gasket 40 covers the intermediate segment 53.

In all of the above embodiments, the disturbances to fluid flow in the intermediate segment 53 make it possible to avoid complying with the condition for the duct to have a diameter of less than 0.6 mm, which condition is necessary in the prior art.

For example, the minimum diameter of the duct 50 may be greater than or equal to 0.8 mm.

There is therefore no need in a duct 50 of the invention to use a system for providing protection against pollution by particles, since the diameter of the duct 50 is large enough to avoid the risk of particles clogging the duct 50.

An actuator may be provided with a piston 1 of the invention.

What is claimed is:

1. A piston having a first face, a second face opposite to the first face, a third face connecting said first and second faces together and presenting a groove, and a sealing gasket housed in said groove, wherein said piston includes a duct constituted by a first segment situated inside the piston and connecting said first face to said groove, by a second segment situated inside the piston and connecting said second face to said groove, and by an intermediate segment connecting together said first and second segments and crossing said groove, the walls of said intermediate segment being formed by the walls of said groove and by said sealing gasket in such a manner that said intermediate segment forms a leaktight tube that opens out solely via the first segment and via the second segment, said intermediate segment presenting at least one obstacle suitable for impeding the flow of fluid that flows along said intermediate segment.

2. A piston according to claim 1, wherein said groove presents side walls and a bottom wall, said intermediate segment extending solely along said bottom wall.

3. A piston according to claim 1, wherein said groove presents side walls and a bottom wall, said intermediate segment extending along said side walls and along said bottom wall.

4. A piston according to claim 1, wherein said intermediate segment presents a plurality of bends that constitute said obstacles impeding the flow of fluid.

5. A piston according to claim 4, wherein said bends are right-angled bends.

6. A piston according to claim 1, wherein said intermediate segment presents at least one constriction that constitutes said at least one obstacle impeding the flow of fluid.

7. A piston according to claim 6, wherein said at least one constriction is present in the portion of said intermediate segment that is formed by the material constituting the walls of said groove.

8. A piston according to claim 6, wherein said at least one constriction is present on the surface of said gasket at locations where said gasket covers said intermediate segment.

9. A piston according to claim 1, wherein the surface of said intermediate segment presents portions in relief that constitute said obstacles impeding the flow of fluid.

10. A piston according to claim 9, wherein said portions in relief are present in the portion of said intermediate segment that is formed by the material of the walls of said groove.

11. A piston according to claim 9, wherein said portions in relief are present on the surface of said gasket at locations where said gasket covers said intermediate segment.

12. A piston according to claim 1, wherein the minimum dimension of any section of said duct is not less than 0.8 mm.

* * * * *